United States Patent [19]

Land

[11] 4,291,964
[45] Sep. 29, 1981

[54] STROBE SWITCH WITH CAMERA CONTROL FEATURE

[75] Inventor: Edwin H. Land, Cambridge, Mass.

[73] Assignee: Polaroid Corporation, Cambridge, Mass.

[21] Appl. No.: 116,268

[22] Filed: Jan. 28, 1980

[51] Int. Cl.³ .............................................. G03B 15/05
[52] U.S. Cl. .................................................... 354/145
[58] Field of Search .......................... 354/17, 32–35, 354/60 F, 139, 141, 145, 149, 288; 315/241 P

[56] References Cited

U.S. PATENT DOCUMENTS

| | | |
|---|---|---|
| 3,757,643 | 9/1973 | Burgarella . |
| 3,820,128 | 6/1974 | Burgarella ............................ 354/32 |
| 3,858,227 | 12/1974 | Ellin ................................... 354/145 |
| 4,016,575 | 4/1977 | Uchiyama et al. .................... 354/33 |
| 4,021,824 | 5/1977 | Uchiyama et al. .................... 354/33 |
| 4,074,295 | 2/1978 | Kee ..................................... 354/145 |
| 4,085,414 | 4/1978 | Burgarella ........................... 354/145 |

FOREIGN PATENT DOCUMENTS 2652073  5/1977  Fed. Rep. of Germany ........ 354/33

Primary Examiner—L. T. Hix
Assistant Examiner—William B. Perkey
Attorney, Agent, or Firm—Edward S. Roman

[57] ABSTRACT

An electronic flash adaptable for releasable connection to a camera of the type having an exposure control circuit automatically switchable from an ambient mode of operation to a flash mode of operation, includes an on/off power control switch adapted for automatically switching the camera control circuit to a flash mode of operation in correspondence with the powering up of the electronic flash. The electronic flash is powered by way of an extendable grip type switch which may be either stowed out of interfering relation with the position normally grasped by the camera user to accommodate use of the camera in an ambient mode of operation or extended into interfering relationship with the position normally grasped by the camera user to accommodate a flash exposure mode of operation.

6 Claims, 5 Drawing Figures

STROBE SWITCH WITH CAMERA CONTROL FEATURE

BACKGROUND OF THE INVENTION

1. Field of the Invention

The present invention relates to an electronic flash on/off power control switch having a camera control feature and, more particularly, to an extendable, grip type, electronic flash on/off power control switch having means for simultaneously controlling the mode of operation for the camera connected thereto.

2. Description of the Prior Art

A compact electronic flash or strobe as disclosed in U.S. Pat. No. 4,074,295, entitled "Compact Accessory Strobe For Cameras With Battery Enclosed Film Pack", by R. Kee, issued Feb. 14, 1978, is adapted for direct connection to a Polaroid SX-70 Land camera or the like. Once the electronic flash is connected to a film cassette laden camera, a battery located within the film cassette provides a steady state voltage which is utilized by the flash to charge a strobe capacitor. A storage capacitor can thereafter be triggered at an appropriate instant during the camera exposure interval by a select trigger signal furnished from the camera so as to discharge the capacitor through a flashtube to provide a source of artificial illumination. Connection from the camera to the flash is made from a flash array receiving socket on top of the camera exposure housing as well as from a remote actuator button socket on the side of the camera exposure housing.

The SX-70 Land camera has an exposure control circuit which is convertible between an ambient and flash mode of operation. The flash includes a connector blade extending outwardly therefrom for receipt within the flash array receiving socket on top of the camera exposure housing in a well-known manner. The connector blade from the flash includes an electrically conductive strip which operates to bridge a pair of spaced contacts in the camera receiving socket to convert the exposure control circuit of the camera from an ambient mode of operation to a flash mode of operation automatically upon the coupling of the flash to the camera flash array receiving socket in a manner as fully described in U.S. Pat. No. 3,757,643, entitled "Photoflash Apparatus", by J. Burgarella, issued Sept. 11, 1973.

The flash, which is attachable to the top of the camera in the foregoing manner, is also provided with a switch control apparatus which may be selectively extended into position so as to be engaged by the photographer when he holds the camera at its normally expected manner as fully described in U.S. Pat. No. 4,085,414, entitled "Electronic Flash Apparatus With Extendable On/Off Switch Control Apparatus", by J. Burgarella et al., issued Apr. 19, 1978. The switch control apparatus operates to apply power to the electronic flash so as to charge the flash capacitor and ready the flash for a subsequent exposure cycle.

As previously discussed, attachment of the flash to the flash array receiving socket on top of the camera exposure housing automatically operates to convert the exposure control circuit of the camera from an ambient mode of operation to a flash mode of operation. Thus, once the flash is connected to the camera, the photographer must make use of the flash and extend the switch control apparatus in the foregoing manner so as to turn on the flash. However, there may be situations in which the photographer might just like to physically connect the flash to the top of the camera exposure housing and still utilize the camera in its ambient exposure mode of operation without flashing the electronic flash.

Therefore, it is a primary object of this invention to provide an electronic flash adapted for releasable connection to a camera wherein the camera may thereafter be utilized in either an ambient or flash exposure mode of operation.

It is a further object of this invention to provide an electronic flash adapted for releasable connection to a camera wherein the camera may thereafter be utilized in an ambient mode of operation without artificial light when the strobe remains unpowered and in a flash mode of operation only when the strobe is powered by an independent on/off switch.

Other objects of the invention will in part be obvious and will in part appear hereinafter. The invention accordingly comprises a mechanism and system possessing the construction, the combination of elements and the arrangement of parts which are exemplifed in the following detailed disclosure.

SUMMARY OF THE INVENTION

An electronic flash apparatus is provided for use with a camera of the type having means for fixedly and electrically connecting to a source of artificial illumination. The camera further includes means for automatically controlling an exposure cycle in an ambient mode absent the connection of the source of artificial illumination thereto and in a flash mode responsive to the electrical connection of the source of artificial illumination to the camera electrical connecting means in a manner operating to electrically short at least two spaced apart mode select terminals on the camera connecting means. Shorting the mode select terminals on the camera enables the camera automatic exposure control to provide a flash fire signal to the source of artificial illumination by way of the electrical connecting means at the appropriate instant during an exposure interval. The electronic flash apparatus comprises a housing together with circuit means responsive to the flash fire signal from the camera for providing a flash of artificial illumination. Switch means connectable to a source of electrical energy control the application of electrical energy to the circuit means. The switch means include means connectable to the spaced apart mode select terminals of the camera connecting means for electrically shorting the mode select terminals to switch the camera to its flash mode of operation in response to closure of the switch means to energize the circuit means. Means selectively extendable from the flash housing and operatively associated with the switch means are provided for controlling the switch means. These control means are extendable subsequent to the fixed releasable connection of the flash housing to the camera, into interfering relation with at least a portion of the area otherwise expected to be occupied by the user's hand when holding the camera in its normal manner. The control means is, thus, extendable into position to be engaged by the user's hand when holding the camera and is also responsive to such engagement by the user's hand to cause the switch means to apply power to the circuit means while simultaneously switching the camera to operate in its flash mode of operation.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENTS

Figure 1:
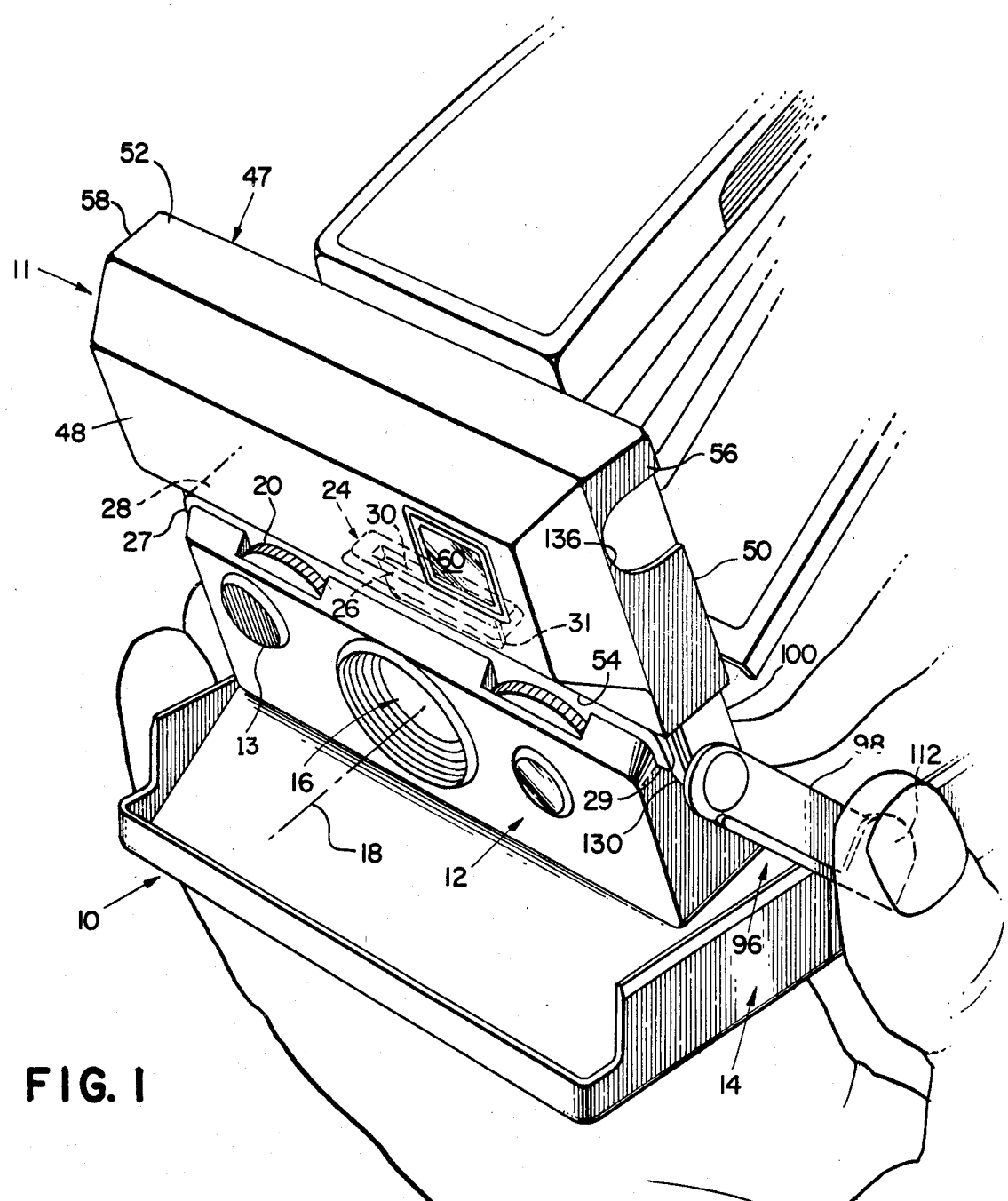
FIG. 1 is a perspective view of an electronic flash unit embodying the switch control of this invention in its operative mode when attached to a camera.

Referring now to FIG. 1, there is shown the front of a folding Polaroid SX-70 Land Camera 10 of the type more fully shown and described in U.S. Pat. No. 3,820,128, by J. Burgarella et al., entitled "Flat Photographic Control System", issued June 25, 1974, and assigned in common herewith. Camera 10 is shown as including a shutter housing section 12 mounted to pivot into a face down position on a base housing section 14 when the camera is folded for storage.

Figure 2:
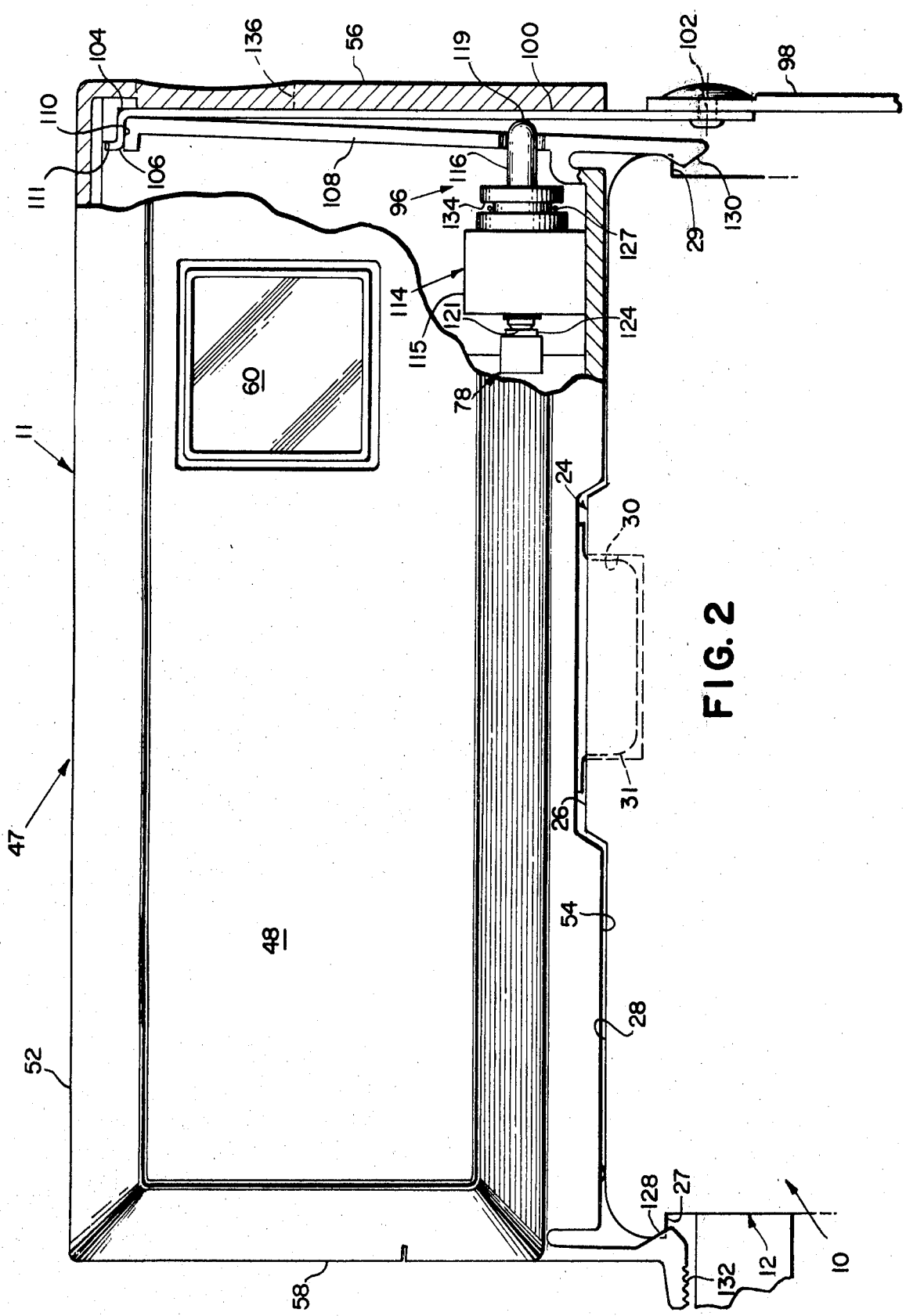
FIG. 2 is a front view, partly in cross-section, of the electronic flash unit of FIG. 1.

Housing section 12 includes a lens and shutter assembly 16 which may be of the type shown in U.S. Pat. No. 3,820,128, supra., having a picture taking axis 18, a focus wheel 20 for focusing the lens and an actuator button 13 for initiating the exposure cycle of the camera. Housing section 12 further includes a flash socket assembly 24, the details of which are more fully described in a U.S. Pat. No. 3,757,643, supra. The flash socket assembly 24 functions in a well-known manner as connecting apparatus for accommodating the releasable fixed connection of an electronic flash or strobe unit as shown generally at 11 with respect to the camera 10. The flash socket assembly 24 in its preferred mode includes a boss 26 which extends from a wall 28 of the shutter housing section 12 and defines an entrance slot 30 which is generally orthogonal to picture taking axis 18 for accommodating receipt of a connector blade 31 from the strobe unit 11 as shown in FIG. 2. In the preferred mode, wall 28 further includes overhanging side portions 27 and 29 at the opposite ends thereof for reasons which will become more apparent from the following discussion.

Figure 3:
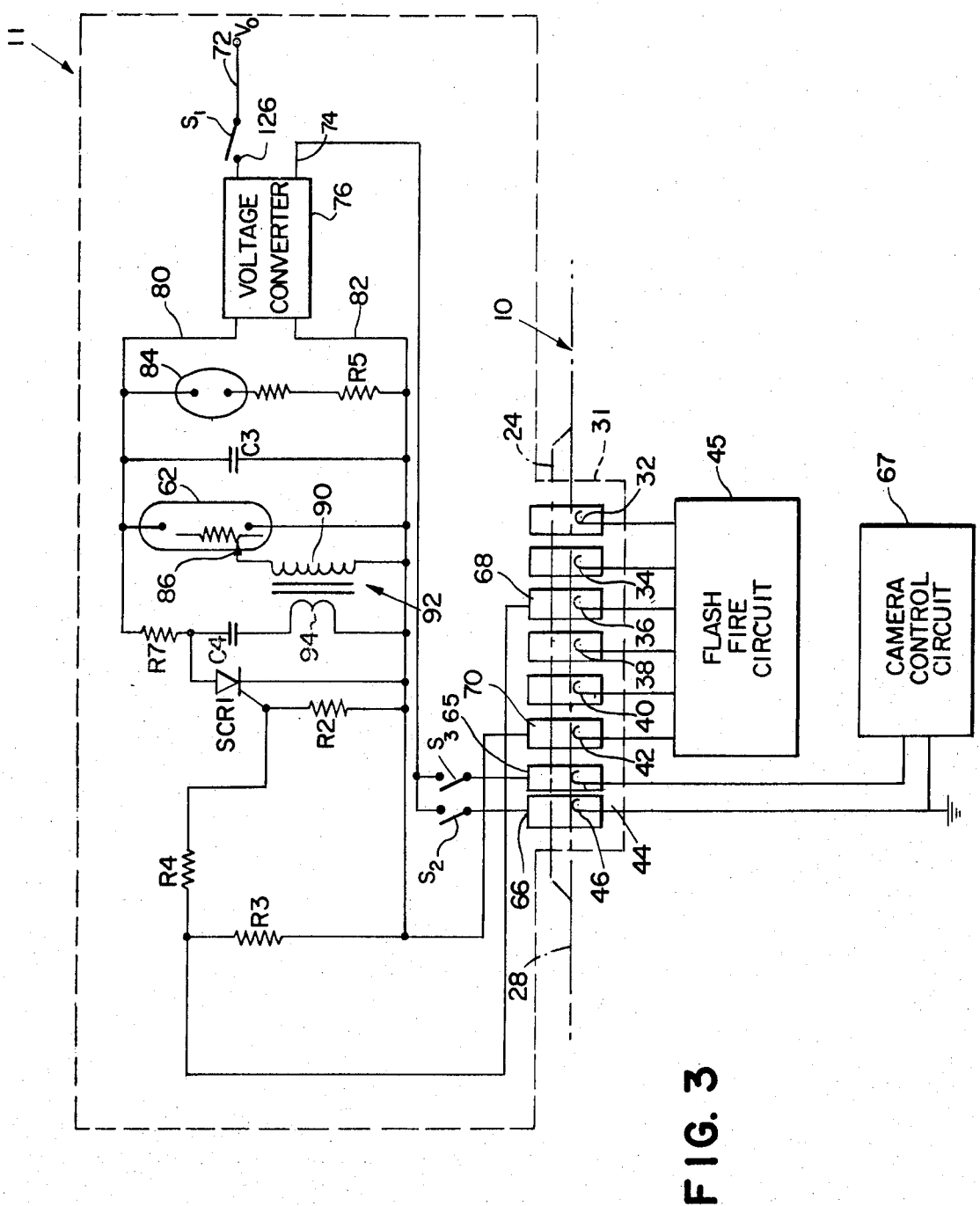
FIG. 3 is a schematic diagram of the electronic circuit of the electronic flash and camera of FIG. 1.

Referring now to the schematic diagram of FIG. 3, the flash socket assembly 24 is shown to include a first set of spaced apart contacts or terminal strips 32, 34, 36, 38, 40 and 42, and a second set of spaced apart mode select contacts or terminal strips 44 and 46. The terminal strips 32–42, in turn, are connected to a flash fire circuit shown generally at 45 as is more fully described in U.S. Pat. No. 3,858,227, entitled "Adapter Apparatus For Flash Firing System", by S. Ellin et al., issued Dec. 31, 1974, in common assignment herewith, and U.S. Pat. No. 3,930,184, entitled "Electronic Flash Coupling System For Sequential Flashbulb Firing Circuit", by C. Biber et al., issued Dec. 30, 1975.

Referring back to FIG. 1, there is shown the flash unit 11 comprising a parallelepiped housing 47 having a generally planar front wall member 48 in spaced apart generally parallel relation to a back wall member 50. The front and back wall members 48 and 50 are peripherally connected, respectively, by generally planar, spaced apart, parallel top and bottom wall members 52 and 54 together with generally planar, spaced apart, parallel side wall members 56 and 58. Front wall member 48 includes a transparent window 60 behind which is stationed an electronic flashtube 62 (FIG. 3) which functions in a well-known manner. The connector blade 31 extends downwardly from the bottom wall member 54 to provide means for physically connecting to the flash socket assembly 24. Thus, insertion of the connector blade 31 into the flash socket assembly 24 provides for the releasable fixed connection of the flash unit 11 to the camera 10.

The connector blade 31 is provided with a pair of spaced apart mode select contacts 65 and 66 that connect, respectively, to the pair of spaced apart mode select terminal strips 44 and 46 upon insertion of the connector blade 31 within the socket assembly 24. Electrically shorting the mode select terminal strips 44 and 46 operates in a known manner to signal a camera control circuit, as shown generally at 67, that the flash unit 11 is in position on the camera and ready to be used in a flash mode of operation as is more fully described in U.S. Pat. No. 3,757,643, supra. Electrical connecting means comprising two additional contacts 68 and 70 are also provided on the connector blade 31 for making respective electrical contact with terminal strips 36 and 42 thereby facilitating receipt by the flash unit 11 of a flash fire trigger signal from the flash fire circuit 44 of the camera 10.

Contacts 68 and 70 on connector blade 31 connect, respectively, to the opposite sides of a resistor $R_3$ which corresponds to the impedance of an unfired flashlamp for reasons which are more fully apparent in U.S. Pat. No. 3,858,227, supra. Thus, resistor $R_3$ preferably has a value in the order of 4 ohms, approximately the resistance of a flashlamp before it is fired. A current limiting resistor $R_4$ and a gate resistor $R_2$ are connected in parallel with the resistor $R_3$.

The flash unit 11 is also adapted to receive a substantially steady state DC voltage by way of a pair of input lines 72 and 74 for powering a conventional voltage converter 76. As will be readily understood, the DC voltage may be derived solely from a battery housed within a film cassette in the camera 10 in a manner as is fully described in U.S. Pat. No. 4,074,295, supra., or alternatively from a battery housed within a film cassette in the camera in conjunction with a supplemental battery housed within the flash 11 in a manner as is fully described in U.S. patent application Ser. No. (Our Case No. 6248), entitled "Electronic Flash Arrangement With Supplemental Battery", by E. Land, filed in common assignment herewith. There is also provided an on/off switch shown generally at 78 in FIGS. 2 and 4 by which the user may control the power connection to the voltage converter 76 and simultaneously select the mode of operation of the camera in the manner of this invention. The switch 78 is preferably of a single throw, triple pole type comprising three contacts $S_1$, $S_2$ and $S_3$ as shown schematically in FIG. 3. Closure of the switch 78 contact $S_1$ operates to apply the positive potential from the camera battery in the manner of U.S. Pat. No. 4,074,295, supra., by way of the input line 72, to the converter 76. In like manner, closure of the switch 78 contact $S_2$ operates to apply the ground potential from the camera battery to the converter 76 by way of the serially connected input line 74, mode select contact 66 and camera mode select terminal strip 46. As is also readily apparent, closure of the switch 78 contacts $S_2$ and $S_3$ operates to electrically short circuit the mode select contacts 65 and 66 thereby short circuiting the camera mode select terminal strips 46 and 44 to signal the camera control circuit 67 to operate in a flash mode as described in U.S. Pat. No. 3,757,643, supra. Thus, the three contact arrangement for the on/off switch 78 permits the physical connection of the electronic flash 11 to the camera 10 by inserting the connector blade 31 within the flash socket 24 while maintaining complete electrical isolation between the flash 11 and camera 10 until the flash 11 is turned on. As is readily apparent, this electrical isolation is maintained even if the input line 72 is connected to the positive potential terminal from the camera battery in the manner described in U.S. Pat. No. 4,074,295, supra.

The voltage converter 76 operates in a conventional manner to convert the DC voltage, to a suitable flash operating voltage such as 350 volts. This voltage appears on a pair of output conductors 80 and 82 from the voltage converter 76.

A first circuit path across the output conductors 80 and 82 includes a ready light 84 and a resistor $R_5$ in series therewith. The ready light 84 may be a conventional gas discharge lamp of any suitable design. The resistor $R_5$ is selected to limit the current flowing through the lamp 84 to a suitable value. A second path across the conductors 80 and 82 comprises a storage capacitor $C_3$ in a suitable size for storage of the energy necessary to fire the flash discharge tube 62. The discharge tube 62 has electrodes connected across the output conductors 80 and 82 in a third path. The tube 62 may be triggered to produce a flash of light when the capacitor $C_3$ is sufficently charged to allow the lamp 84 to glow and a relatively high voltage spike, such as 5,000 volts, is applied to the grid terminal 86 of the tube 62.

The grid 86 is connected to the conductor 82 through the high voltage secondary winding 90 of a pulse transformer generally designated at 92. The low voltage primary winding 94 of the transformer 92 has one terminal connected to the conductor 82 and a second terminal connecting through a capacitor $C_4$, in series with a resistor $R_7$, to the conductor 80. A silicon controlled rectifier $SCR_1$ has its anode terminal connected to the junction of the resistor $R_7$ and the capacitor $C_4$ and its cathode terminal connected to the conductor 82. Resistor $R_2$ is connected between the gate and the cathode of the silicon controlled rectifier $SCR_1$ to prevent false triggering of the controlled rectifier.

Figure 4:
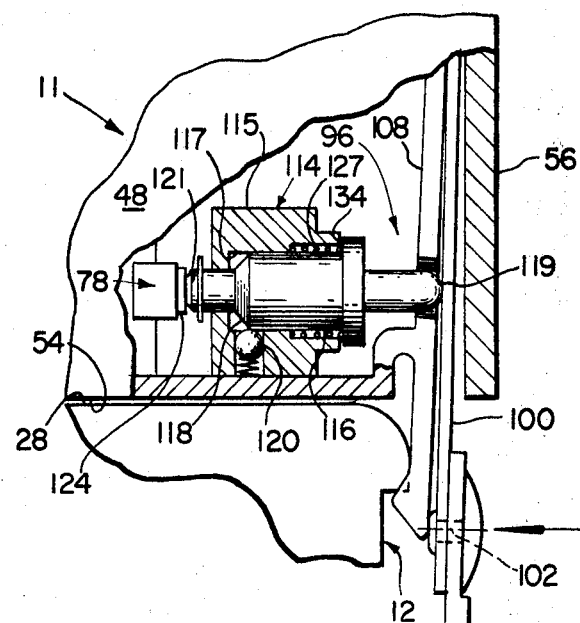
FIG. 4 is an enlarged fragmentary view, partly in cross-section of a portion of the electronic flash unit of FIG. 2.

Referring now to FIGS. 2 and 4, it can be seen that the flash unit 11 is provided with switch control means, as shown generally at 96 and fully described in U.S. Pat. NO. 4,085,414, supra., for selectively controlling the on/off condition of switch 78 and its associated mode select contacts 65 and 66 in the manner of this invention. The switch control means 96 includes a first elongated member 98 pivotally connected at one end thereof along an axis as shown at 102, to one end of a second elongated member 100. An interior, generally planar, wall member 108 is provided in generally parallel, spaced apart, relation inward of the side wall member 56 with the space therebetween being of sufficient width to accommodate limited lateral displacement of the elongated member 100 therebetween. The other end of the elongated member 100 is folded into two right angle bends as shown at 104 and 106 to provide a portion 110 thereof in overhanging relation with respect to the top edge of the interior wall member 108 to accommodate limited lateral pivotal movement of the elongated members 98 and 100 thereabout in directions generally orthogonal to the wall members 56 and 108 and generally coincident to the axis 102 about which the elongated members 100 and 98 are pivotally connected at 102. The right angle bend 106 of member 100 also engages an abutment face 111 in a manner operating to secure the pivot point and inhibit the overhanging portion 110 from wandering off the top edge of wall member 108.

The switch control means 96 additionally includes control apparatus as shown generally at 114 comprising a housing 115 through which there is provided a central bore 117 to accommodate reciprocal motion of a plunger 116 disposed therein. One end of the plunger 116 as shown at 119 is engaged by the elongated member 100 so as to translate inwardly into the housing 115 upon the lateral pivotal movement of the elongated members 100 and 98 toward the interior wall member 108. The plunger 116 preferably includes a truncated frustoconical surface 118 which cooperatively engages a spring loaded reciprocal ball 120 in the usual manner to provide a positive snap-action upon translation of the plunger 116 into the housing 115. The other end of the plunger 116, as shown at 121, is arranged to engage an actuating member 124 of the on/off switch 78 in a manner operating to simultaneously deflect all the switch contacts $S_1$, $S_2$ and $S_3$ into shorting engagement with a respective contact so as to simultaneously power the converter 76 and short the mode select contacts 65 and 66 upon translation of the plunger 116 into the housing 115. There is also provided a helical compression spring 127 around the plunger 116 in engagement with a raised peripheral edge 134 thereof to continuously urge the plunger 116 into translation outward of the housing 115 toward the side wall 56.

Figure 5:
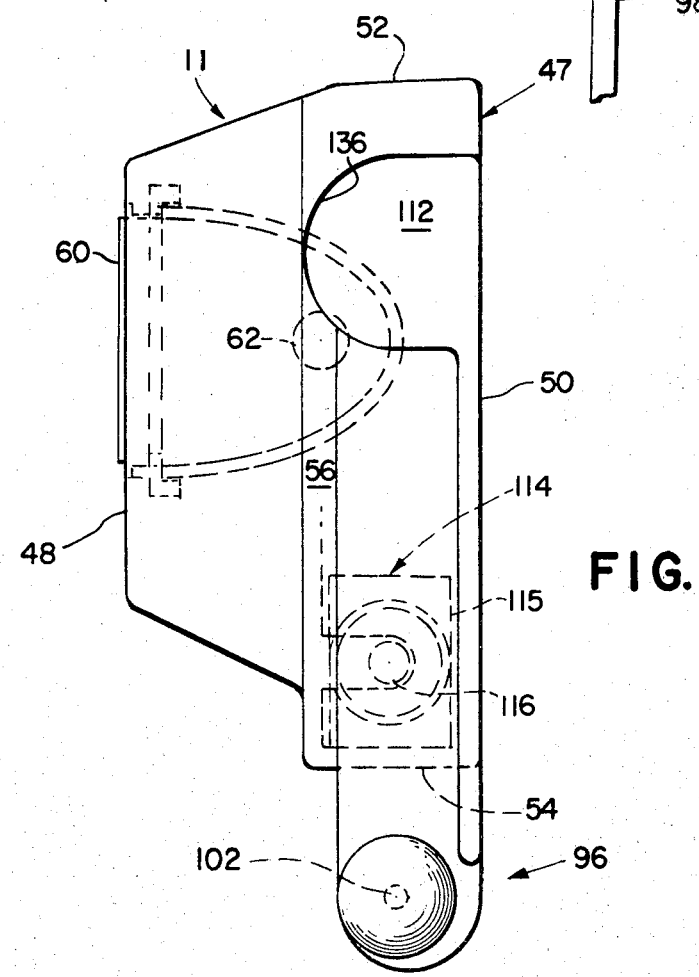
FIG. 5 is a side view of the electronic flash unit of FIG. 2.

The outward end of the elongated member 98 includes a raised grip portion 112 which may be engaged by the hand of a user in the manner of this invention to be subsequently described. The end wall 56 may also include a cutaway or recessed portion 136 complementary to the raised grip portion 112 thereby accommodating receipt of the raised grip portion 112 therein upon counterclockwise rotation of the elongated member 98 into its stowed position as shown in FIG. 5.

The strobe unit 11 may be used in conjunction with the camera 10 in the following manner. The connector blade 31 from strobe 11 is first inserted in the usual manner within the flash socket assembly 24 thereby establishing a removable fixed connection between the flash unit 11 and camera 10. The elongated member 98 may thereafter be rotated in a clockwise direction as viewed from FIG. 1 from its stowed position adjacent the cutaway portion 136 to its fully extended position as shown in FIG. 1 with the raised grip portion 112 in spaced apart relation aside the base housing section 14 of the camera.

Polaroid SX-70 type Land cameras are held in a normally expected manner by the user who grasps the underlying surface of the base housing section 14 in the palm of his hand while engaging the opposed sides of the base housing section 14 with his thumb and fingers respectively as shown in FIG. 1. As is now readily apparent, extension of the elongated member 98 in the aforementioned manner operates to move the raised grip portion 112 into interfering relation with that portion of the camera base housing section 14 that would otherwise be occupied by the user's thumb when grasping the camera in the normally expected manner.

Thus, the user upon pivotally extending the elongated member 98, will thereafter when attempting to grasp the camera in the usual manner engage the raised grip portion 112 with his thumb so as to laterally pivot the elongated members 98 and 100 toward the interior wall member 108. As is readily apparent, such lateral pivoting of the elongated members 98 and 100 operates to translate the plunger 116 into the housing 115 so as to compress the spring 127 while simultaneously displacing the reciprocating ball 120 radially outward. At the same time, the other end of the plunger at 121 engages the actuating member 124 of the on/off switch 78 so as to simultaneously deflect all the switch contacts $S_1$, $S_2$ and $S_3$ into shorting electrical connection with their respective contacts thereby applying power to converter 76 and simultaneously shorting the mode select contacts 65 and 66. As is readily apparent, shorting the mode select contacts 66 and 65 operates to short the connecting camera mode select terminals 44 and 46 to signal the camera control circuit 67 to operate in the flash mode in a manner as is fully described in U.S. Pat. No. 3,757,643, supra. Thus, with the switch control means 96 extended in the foregoing manner, the user may power the voltage converter 76 and simultaneously switch the camera to operate in the flash mode simply by grasping the camera in the usual manner to engage the raised grip portion 112 with his thumb without having to take his eye away from the viewfinder to find the flash on/off switch.

Once the camera is grasped and the switch 78 closed in the aforementioned manner, the user must wait for the voltage converter 76 to charge the capacitor $C_3$ to its prescribed value as indicated by the ready light 84 being lit. The user may thereafter implement a photographic exposure cycle in the usual manner by depressing the actuator button 13. During the flash mode exposure interval, the flash fire circuit 45 provides a flash fire trigger signal at the appropriate instant to the terminals 68 and 70 which causes a current to flow through the resistors $R_3$ in parallel with $R_2$ and $R_4$ so as to gate the silicon controlled rectifier $SCR_1$ into condition. Assuming that the capacitors $C_3$ and $C_4$ are charged as previously discussed, with the $SCR_1$ conducting, the capacitor $C_4$ will discharge, causing the pulse transformer 92 to gate the flash tube 62 into conduction to produce a light flash.

Should the user thereafter decide to leave the camera in its erect position with the flash unit still attached, he may do so without worry as to whether he has turned off the strobe since his release of the raised grip portion 112 will automatically operate to open the on/off switch 78 thereby electrically isolating the flash 11 from the camera 10 in the aforementioned manner. The plunger 116 is automatically translated to its terminal position outside the housing 115 by virtue of the spring 127. In this manner, the switch contacts $S_1$, $S_2$ and $S_3$ of switch 78 are allowed to deflect to their normally open condition so as to block the flow of charging current from the camera battery to the voltage converter 76 and open the electrical connection between the mode select contacts 65 and 66.

In the event that the user may wish to operate the camera in its normal ambient mode of operation without flash, but still maintain the fixed connection between the flash 11 and camera 10 for his convenience in carrying both camera and flash, he may now do so simply by inserting the connector blade 31 from the strobe 11 within the flash socket assembly 24 and not remove the elongated member 98 from its stowed position. The user may then grasp the camera 10 in the usual manner as previously described without closing the on/off switch 78 thereby leaving the flash mode select contacts 65 and 66 open circuited to signal the camera control circuit 67 by way of the interconnecting camera mode select terminals 44 and 45 to operate in an ambient mode and thereby not provide a flash fire signal during the exposure interval. Thus, the camera may be grasped in its normally expected manner and operated in either an ambient mode or a flash mode with the flash unit 11 fixedly connected thereto depending upon whether the switch control means 96 remains in its stowed or extended position.

In the preferred embodiment, the means for physically connecting the flash unit 11 to the camera 10 in a releasable manner may additionally include a pair of spaced apart, resilient, C-type clips 128, 130 which are adapted to resiliently engage respective overhanging side portions 27 and 29 of the wall member 28. Resilient clip 128 may additionally include a cantilevered portion 132 extending laterally outward therefrom to accommodate engagement by a user in an upward direction in a manner operating to deflect the C-type clip 128 out off engagement with the overhanging side portion 27. The overhanging side portions 27 and 29 may thus form part of the connecting apparatus which permits the removable fixed connection of the flash unit 11 with respect to the camera 10.

Wherein the camera 10 is herein described as being a Polaroid SX-70 Land Camera 10, it will be readily understood that the invention is by no means so limited and may be applicable to other cameras such as Polaroid's more recently introduced Pronto! type-cameras which also utilize Polaroid's SX-70 type film. Therefore, since certain changes may be made in the above described system and apparatus without departing from the scope of the invention herein involved, it is intended that all matter contained in the description thereof, or shown in the accompanying drawings shall be interpreted as illustrative and not in a limiting sense.

What is claimed is:

1. An electronic flash apparaus for use with a camera of the type having means for fixedly and electrically connecting to a source of artificial illumination and means for automatically controlling an exposure cycle in an ambient mode absent the connection of the source of artificial illumination and in a flash mode responsive to the electrical connection of the source of artificial illumination to the camera electrical connecting means in a manner operating to electrically short at least two spaced apart mode select terminals on the camera connecting means thereby enabling the automatic exposure control means to provide a flash fire signal to the source of artificial illumination by way of the electrical connecting means at the appropriate instant during an exposure interval, said electronic flash apparatus comprising:
a housing;

circuit means responsive to the flash fire signal from the camera for providing a flash of artificial illumination; and switch means connectable to a source of electrical energy for controlling the application of electrical energy to said circuit means, said switch means further including means connectable to the spaced apart mode select terminals of the camera connecting means for electrically shorting the mode select terminals to switch the camera to its flash mode of operation in response to the closure of said switch means to energize said circuit means, said switching means also including at least three switch contacts simultaneously switchable from an open circuit condition to a short circuit condition, two of said switch contacts serving to control the application of electrical energy to said circuit means in a manner whereby open circuiting said two switch contacts operates to electrically isolate said circuit means from the camera and the other of said switch contacts in cooperation with one of said two switch contacts serving to control the electrical short circuiting of the camera mode select terminals.

2. An electronic flash apparatus for use with a camera of the type having means for fixedly and electrically connecting to a source of artificial illumination and means for automatically controlling an exposure cycle in an ambient mode absent the connection of the source of artificial illumination and in a flash mode responsive to the electrical connection of the source of artificial illumination to the camera electrical connecting means in a manner operating to electrically short at least two spaced apart mode select terminals on the camera connecting means thereby enabling the automatic exposure control means to provide a flash fire signal to the source of artificial illumination by way of the electrical connecting means at the appropriate instant during an exposure interval, said electronic flash apparatus comprising:

a housing;

circuit means responsive to the flash fire signal from the camera for providing a flash of artificial illumination;

switch means connectable to a source of electrical energy for controlling the application of electrical energy to said circuit means, said switch means further including means connectable to the spaced apart mode select terminals of the camera connecting means for electrically shorting the mode select terminals to switch the camera to its flash mode of operation in response to the closure of said switch means to energize said circuit means, said switching means also including at least three switch contacts simultaneously switchable from an open circuit condition to a short circuit condition, two of said switch contacts serving to control the application of electrical energy to said circuit means in a manner whereby open circuiting said two switch contacts operates to electrically isolate said circuit means from the camera and the other of said switch contacts in cooperation with one of said two switch contacts serving to control the electrical short circuiting of the camera mode select terminals; and means selectively extendable from said flash housing and operatively associated with said switch means for controlling said switch means, said control means being extendable, subsequent to the fixed connection of said flash housing to the camera, into interfering relation with at least a portion of the area otherwise expected to be occupied by the user's hand when holding the camera in its normal manner, said control means thereby being extendable into position to be engaged by the user's hand when holding the camera and also being responsive to such engagement by the user's hand as to cause said switch means to apply power to said circuit means while simultaneously switching the camera automatic exposure control means to operate in its flash mode of operation.

3. The electronic flash of claim 1 wherein said switch means comprises a single throw, triple pole switch.

4. The electronic flash of claim 2 wherein said circuit means comprises: a storage capacitor; a flash discharge tube; means responsive to power applied by way of said switch means for charging said capacitor; and means responsive to the flash fire signal for discharging said capacitor through said discharge tube to produce an illuminating flash of light.

5. The electronic flash of claims 2 or 4 wherein said control means includes means responsive to disengagement by the user to cause said switch means to disconnect the power from said circuit means and open circuit the exposure control mode select terminals thereby switching the camera to operate in its ambient mode of operation.

6. The electronic flash of claims 2 or 4 wherein the camera electrical connecting means comprises a flash socket assembly adapted for receipt of a conventional multiple flashbulb array and said electronic flash housing includes a connector blade extending outward of said housing and adapted for receipt within the camera flash socket assembly, said connectable switch means comprising two spaced contacts on said blade arranged to contact respectively the two camera mode select terminals upon insertion of said connector blade within the camera socket, said switch means further comprising a switch element electrically connecting said spaced contacts on said blade for electrically shorting said spaced contacts on said blade upon closure of said switch element.

* * * * *